(12) United States Patent
Hillermeier et al.

(10) Patent No.: US 7,877,240 B2
(45) Date of Patent: Jan. 25, 2011

(54) METHOD FOR DETECTING THE SOURCES OF FAULTS OR DEFECTIVE MEASURING SENSORS BY WORKING CASE MODELING AND PARTIAL SUPPRESSION OF EQUATIONS

(75) Inventors: Claus Hillermeier, Übersee (DE); Georg Hoever, Aachen (DE); Hans Mauser, München (DE)

(73) Assignee: Siemens Aktiengesellschaft, Munich (DE)

( * ) Notice: Subject to any disclaimer, the term of this patent is extended or adjusted under 35 U.S.C. 154(b) by 426 days.

(21) Appl. No.: 11/632,913

(22) PCT Filed: Jul. 18, 2005

(86) PCT No.: PCT/EP2005/053448

§ 371 (c)(1),
(2), (4) Date: Sep. 25, 2008

(87) PCT Pub. No.: WO2006/018360

PCT Pub. Date: Feb. 23, 2006

(65) Prior Publication Data

US 2009/0083573 A1    Mar. 26, 2009

(30) Foreign Application Priority Data

Aug. 10, 2004    (DE) .................... 10 2004 038 835

(51) Int. Cl.
*G06F 17/50* (2006.01)
*G06F 11/00* (2006.01)
*G01N 37/00* (2006.01)
*G01P 21/00* (2006.01)

(52) U.S. Cl. .................. 703/2; 714/3; 714/37; 714/47; 714/48; 714/57; 702/81; 702/91; 702/93

(58) Field of Classification Search .................. 703/2; 714/3, 37, 47, 48, 57; 702/81, 91, 93
See application file for complete search history.

(56) References Cited

U.S. PATENT DOCUMENTS

| 6,594,620 | B1 | 7/2003 | Qin et al. |
| 7,308,385 | B2 * | 12/2007 | Wegerich et al. ............. 702/183 |
| 7,373,283 | B2 * | 5/2008 | Herzog et al. .................. 703/2 |
| 7,640,145 | B2 * | 12/2009 | Wegerich et al. ............... 703/2 |
| 2002/0188429 | A1 * | 12/2002 | Martis ......................... 702/189 |
| 2003/0005747 | A1 * | 1/2003 | van der Geest et al. ...... 73/1.16 |
| 2005/0210337 | A1 * | 9/2005 | Chester et al. ................ 714/47 |

OTHER PUBLICATIONS

Unbehauen, H.: Regelungstechnik II; Braunschweig/Wiesbaden, Vieweg & Sohn, 1989, pp. 2-6; ISBN: 3-528-43348-5.
Unbehauen, H. Regelungstechnik I; Braunschweig/Wiesbaden, Vieweg & Sohn, 1989 pp. 40-44, ISBN: 3-528-53332-3.

* cited by examiner

*Primary Examiner*—Paul L Rodriguez
*Assistant Examiner*—Nithya Janakiraman
(74) *Attorney, Agent, or Firm*—Staas & Halsey LLP

(57) ABSTRACT

A global system model equation including model equations, which contain parameters, of individual components that form the global system. The parameters of the individual components are detected using sensor values from the sensors that are allocated to the individual components and it is determined whether it is possible to adapt the parameters to the sensor values and to solve the global system model equation.

14 Claims, 1 Drawing Sheet

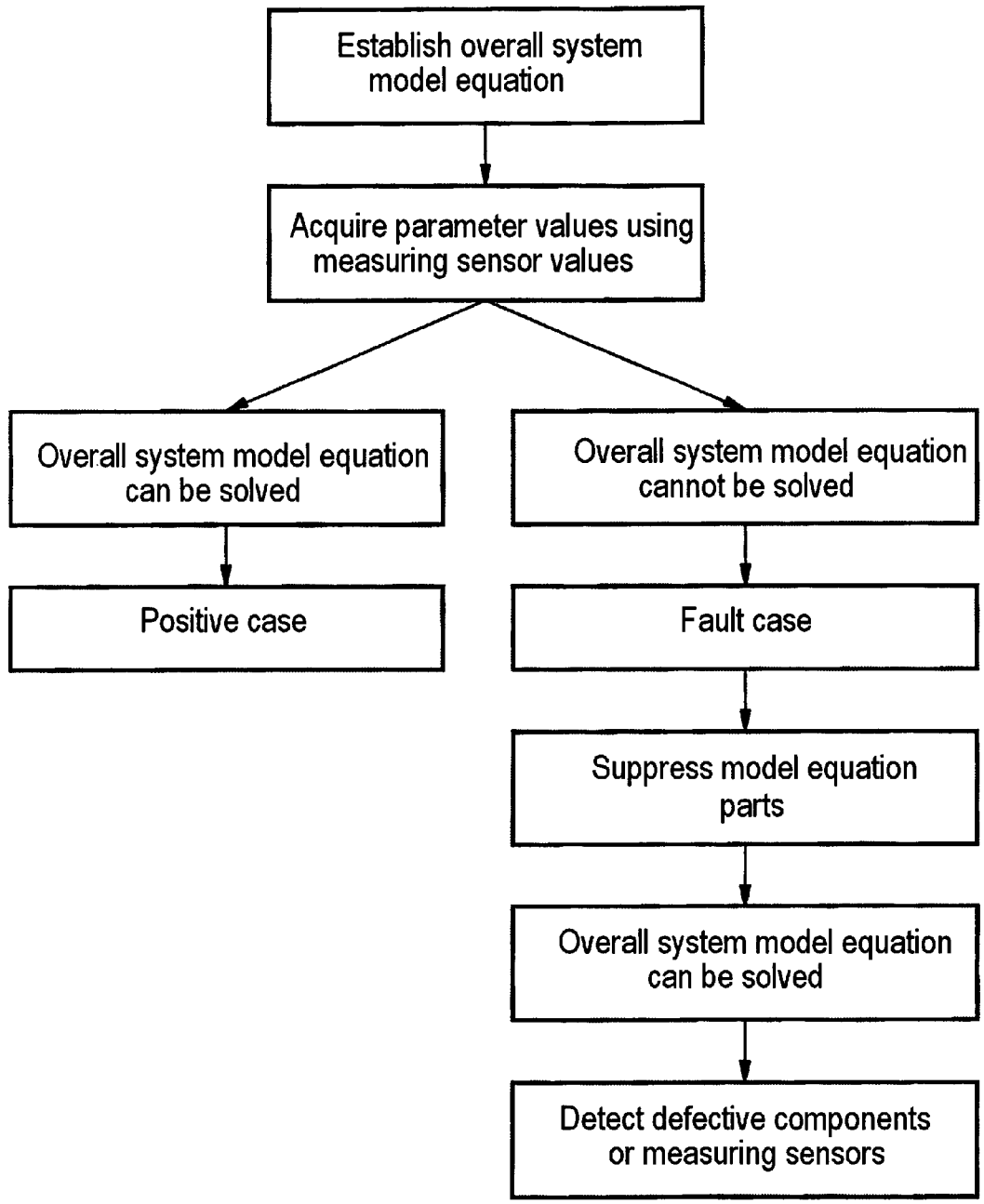

METHOD FOR DETECTING THE SOURCES OF FAULTS OR DEFECTIVE MEASURING SENSORS BY WORKING CASE MODELING AND PARTIAL SUPPRESSION OF EQUATIONS

CROSS REFERENCE TO RELATED APPLICATIONS

This application is based on and hereby claims priority to Application No. PCT/EP2005/053448 filed Jul. 18, 2005 and German Application No. 10 2004 038 835.0 filed Aug. 10, 2004, the contents of which are hereby incorporated by reference.

BACKGROUND

In complex technical systems it is often difficult to find the precise cause of the fault when malfunctions occur. In a pipe system, for example, the consequence of a leak is that as operation proceeds too small flows are measured and a too severe drop in pressure occurs. Appropriate measuring sensors then raise the alarm, frequently resulting in a flood of messages. Furthermore the repercussions of the fault can appear at some distance from the site where the fault occurred. A further problem is that false alarms can be triggered by incorrect measurements.

Conventionally there are—in addition to a manual analysis of the message flood—approaches for identifying the cause of the fault using neural networks.

SUMMARY

It is therefore one possible object of the present invention to provide, in a simple and cost-effective manner, a method and a device for monitoring a complex technical system in its entirety.

The system under consideration is modeled according to a component-oriented principle. With this arrangement each component contributes certain equations to be satisfied to the model, in the form of an overall system model equation; a pipe, for example, contributes a mass conservation equation. With this component-oriented modeling each component is described on the basis of a model equation that is to be satisfied by said component and integrated into an overall system model equation. By measured values obtained using measuring sensors the associated parameter values, and consequently said model, are adjusted to reality. Corresponding methods (least-squares adjustments, Gauβ-Newton iteration) are known. In the positive case this adjustment of the model parameters to the sensor values is successful while observing certain variations in precision.

In a fault situation or, as the case may be, in the event of a seriously erroneous measurement, the parameters can no longer be adjusted consistently (that is to say within the scope of the measuring and modeling accuracies). It is determined that an adjustment of parameters to sensor values is not possible and the overall system model equation cannot be solved. However, if the model equations or model equation parts that are associated with the defective component or the defective measuring sensor are suppressed from the overall system model equation, an acceptable adjustment is successful once more.

In this way a diagnosis can easily be performed:

If an acceptable adjustment of the measured values to the model equations is successful, fault-free operation can be assumed. If not, an adjustment is successively performed, with one measured value being suppressed each time. If an acceptable adjustment is successful when a specific measured value is omitted, this indicates that the sensor associated with the omitted measured value is defective.

In order to locate the source of a fault more accurately in the case of a malfunction, the following procedure can be applied (in parallel with or following an unsuccessful search for a defective measuring sensor as above): The equations associated with one component in each case are suppressed from the model equation system. The fault then lies in the component wherein the reduced equation system can be acceptably solved. One can now try gradually adding the individual equations of the component rated as defective to the equation system once more in order to reach a conclusion about the type of fault. In the case of a leak, for example, a temperature equation will continue to be satisfied, whereas only a mass balance equation leads to an equation system that cannot reasonably be solved.

The advantage of the method is that only a modeling of the positive case of the system is required. No fault scenarios need to be included in the model. The evaluation is performed on an automated basis. No expert knowledge is necessary for the purpose of the evaluation.

The method can be efficiently implemented as follows.

The mathematical formalism of the adjustment results in sensitivities in respect of which variables are strongly dependent on which (Jakobi matrix). This can be used to establish an order for the suppressions of measured values or components.

In order to calculate the adjustments for the individual suppressions it is not necessary to apply the entire mathematical algorithm right from the beginning. Partial results from the calculation can be reused and update strategies employed.

It is also particularly advantageous that partial results from the calculation can be reused for calculating adjustments for individual suppressions.

According to an advantageous exemplary embodiment the defective component and/or the defective measuring sensor is identified or, as the case may be, displayed using for an appropriate display.

It is also particularly advantageous if the defective component or, as the case may be, the defective measuring sensor is removed from the overall system.

It is also particularly advantageous if the defective component or, as the case may be, the defective measuring sensor is replaced by properly functioning components or, as the case may be, measuring sensors.

The monitoring or, as the case may be, fault diagnosis can be performed particularly easily by a personal computer (PC).

In order to perform the method using a PC it is particularly advantageous if the codes of the method are stored on a storage medium such as a CD-ROM, for example, and thus are suitable for execution by a PC.

BRIEF DESCRIPTION OF THE DRAWINGS

These and other objects and advantages will become more apparent and more readily appreciated from the following description of the preferred embodiments, taken in conjunction with the accompanying drawing of which:

FIG. 1 shows the individual steps for fault diagnosis.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

First, an overall system model equation which describes the overall system is established. With each model equation of a component specific parameters such as, for example, temperature, mass flow or density which adequately describe the component are acquired. Next, actual values of the parameters are acquired by measuring sensors provided for the components. If all the acquired parameter values are incorporated into the overall system model equation in such a way that the latter can be solved, a fault-free operating state of the overall system is present.

If, on the other hand, the overall system model equation cannot be solved, a fault situation is present for the overall system. In order to detect the defective component(s) or, as the case may be, measuring sensors, model equations or model equation parts assigned to said components or measuring sensors are suppressed from the overall system model equation in such a way until a point is reached where said equation can be solved. Toward that end model equations or model equation parts can be alternatively or cumulatively suppressed in order to arrive at an unmistakable determination of the defective component(s) or measuring sensors. It is also possible to suppress the entire model equation of a defective component in order to take individual model equation parts into account again step by step subsequently in the overall system model equation. As soon as said overall system model equation then once again cannot be solved, the last subcomponent or, as the case may be, the last measuring sensor taken into account is defective.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for monitoring a technical system in its entirety, comprising:
    establishing an overall system model equation including model equations or model equation parts of individual components forming the technical system, said model equations or said model equation parts having parameters, each component being associated with at least one respective parameter;
    acquiring values for the parameters of the individual components using data from sensors assigned to said individual components;
    adjusting the parameters to solve the overall system model equation; and
    if it is determined that it is not possible to solve the overall system equation by adjusting the parameters, suppressing model equations or model equation parts assigned to respective components cumulatively or alternatively from the overall system model equation to solve a remaining overall system model equation, resulting in detection of a respective defective component or defective sensor.

2. The method as claimed in claim 1, wherein
    after all model equations or model equation parts associated with defective components have been suppressed, individual model equations or model equation parts having correct associated parameters are added to the overall system model equation in place of suppressed model equations or model equation parts to detect defective sensors.

3. The method as claimed in claim 1, wherein
    a Jacobi matrix is generated to determine an order for suppression of the model equations or model equation parts assigned to the components or the measuring sensors.

4. The method as claimed in claim 1, wherein
    partial results from previous cumulative or alternative suppression of model equations or model equation parts are used in future adjustments of parameters or for suppression of model equations or model equation parts.

5. The method as claimed in claim 1, further comprising:
    displaying the defective component or defective sensor.

6. The method as claimed in claim 1, wherein
    the defective component or the defective sensor is removed from the technical system.

7. The method as claimed in claim 1, wherein the defective component or the defective sensor is replaced by a properly functioning component or a properly functioning sensor.

8. The method as claimed in claim 2, wherein:
    a Jacobi matrix is generated to determine an order for suppression of the model equations or model equation parts assigned to the components or the measuring sensors.

9. The method as claimed in claim 8, wherein:
    partial results from previous cumulative and iterative suppression of model equations or model equation parts are used in future adjustments of parameters or for suppression of model equations or model equation parts.

10. The method as claimed in claim 9, further comprising:
    displaying the defective component or defective sensor.

11. The method as claimed in claim 10, wherein
    the defective component or the defective sensor is removed from the technical system.

12. The method as claimed in claim 11, wherein
    the defective component or the defective sensor is replaced by a properly functioning component or a properly functioning sensor.

13. A device to monitor a technical system in its entirety, the device comprising:
    an equation unit to establish an overall system model equation including model equations or model equation parts of individual components forming the technical system, said model equations or said model equation parts having parameters, each component being associated with at least one respective parameter;
    an acquisition unit to acquire values for the parameters of the individual components using data from sensors assigned to said individual components;
    an adjustment unit to adjust the parameters to solve the overall system model equation; and
    a suppression unit configured to suppress, if it is determined that it is not possible to solve the overall system equation by adjusting the parameters, model equations or model equation parts assigned to respective components cumulatively or alternatively from the overall system model equation to solve a remaining overall system model equation, resulting in detection of a respective defective component or defective sensor.

14. A non-transitory computer-readable medium recording medium on which is recorded a program for monitoring a technical system in its entirety, the program causing a computer to perform:
    establishing an overall system model equation including model equations or model equation parts of individual components forming the technical system, said model equations or said model equation parts having parameters, each component being associated with at least one respective parameter;

acquiring values for the parameters of the individual components using data from sensors assigned to said individual components;

adjusting the parameters to solve the overall system model equation; and if it is determined that it is not possible to solve the overall system equation by adjusting the parameters, suppressing model equations or model equation parts assigned to respective components cumulatively or alternatively from the overall system model equation to solve a remaining overall system model equation, resulting in detection of a respective defective component or defective sensor.

* * * * *